(12) United States Patent
Madaras et al.

(10) Patent No.: US 7,119,178 B2
(45) Date of Patent: Oct. 10, 2006

(54) MULTIMETALLIC POLYMERIC AZO COLORANTS

(75) Inventors: Mihaela L. Madaras, Webster, NY (US); Steven Evans, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 301 days.

(21) Appl. No.: 10/865,129

(22) Filed: Jun. 10, 2004

(65) Prior Publication Data

US 2005/0277765 A1 Dec. 15, 2005

(51) Int. Cl.
*C09B 45/00* (2006.01)
*C08G 73/06* (2006.01)

(52) U.S. Cl. .................. 534/698; 534/DIG. 3

(58) Field of Classification Search .......... 534/698, 534/DIG. 3
See application file for complete search history.

(56) References Cited

U.S. PATENT DOCUMENTS

| | | | | |
|---|---|---|---|---|
| 5,166,326 | A * | 11/1992 | Smith et al. | 534/701 |
| 5,362,812 | A * | 11/1994 | Holmes et al. | 525/274 |
| 5,725,641 | A | 3/1998 | MacLeod | |
| 5,980,622 | A | 11/1999 | Byers | |
| 6,001,161 | A | 12/1999 | Evans et al. | |
| 6,302,949 | B1 | 10/2001 | Peter | |
| 2001/0027734 | A1 | 10/2001 | Geisenberger et al. | |
| 2002/0139281 | A1 | 10/2002 | Stoffel et al. | |
| 2003/0088077 | A1 | 5/2003 | Yamada et al. | |
| 2003/0159616 | A1 | 8/2003 | Wang et al. | |
| 2003/0172839 | A1 | 9/2003 | Tyrell et al. | |
| 2005/0282926 | A1 * | 12/2005 | Madaras et al. | 523/160 |

FOREIGN PATENT DOCUMENTS

| | | |
|---|---|---|
| EP | 1 284 200 | 2/2003 |
| GB | 2 372 750 | 9/2002 |
| WO | 2004/011560 | 2/2004 |
| WO | 2004/011561 | 2/2004 |
| WO | 2004/011562 | 2/2004 |

OTHER PUBLICATIONS

Hojo et al., Chemical Abstracts, 74:64572, 1971.*
Vishwanath Banerjie, Arun K. Dey; Markromol. Chem.; Rapid Commun. 1; 41-46 (1980); "Polymeric Metallated Organic Pigments".
P. Gregory; "Metal Complexes As Specialty Dyes And Pigments"; Comprehensive Coordination Chemistry II-From Biology To Nanotechnology; Elsevier Ltd.; 2003; Chapter 9.12; pp. 549-579.
U.S. Appl. No. 10/865,665; concurrently filed; titled "Ink Jet Ink Containing Multimetallic Polymeric Colorants"; of Mihaela L. Madaras et al., Jun. 10, 2004.

* cited by examiner

*Primary Examiner*—Fiona T. Powers
(74) *Attorney, Agent, or Firm*—Sarah Meeks Roberts

(57) ABSTRACT

This invention relates to a multimetallic oligomeric or polymeric colorant wherein said colorant is derived from the polymerization of a metal cation with a dimeric tridentate ligand containing a coordinating azo group.

24 Claims, No Drawings

MULTIMETALLIC POLYMERIC AZO COLORANTS

FIELD OF THE INVENTION

This invention relates to a new class of polymeric, multimetallic complex azo colorants. These colorants could find applications in electrophotography, displays, plastics, coatings, recording media, nanotechnology, or as colorants for inkjet inks.

BACKGROUND OF THE INVENTION

Metallic complexes of various azo dyes may be divided into two classes: those in which the azo group doesn't participate in the complexation, and those in which the azo group is one of the coordination sites. These latter complexes have more commercial applications because they exhibit better light stability than similar complexes where the azo nitrogen is not involved in the complexation.

Metal complexes can usually have different ratios between ligands and metal ions, e.g. 1:1, 2:1, and 3:1, etc. Also, depending on the number of coordination sites, ligands can be monodentate, bidentate, tridentate etc. Usually, the more coordination sites in a ligand, the better the chemical stability of the complex. For a comprehensive review on metal complex colorants, including metallized azo dyes and pigments see "Metal Complexes as Specialty Dyes and Pigments" by P. Gregory in *Comprehensive Coordination Chemistry II-From Biology to Nanotechnology* Elsevier Ltd., 2003; Chapter 9.12, pp549–579.

If a ligand can form a 2 (or higher):1 (ligand:metal ratio) complex and if two or more ligand molecules are covalently bound such that an intramolecular complexation is not possible, upon metallation, this ligand could potentially form a multimetallic polymeric structure. These multimetallic polymeric azo colorants may have a wide range of molecular weights, potentially controlled by a variety of conditions: e.g. solubility in the polymerization/metallation reaction mixture, the amounts of monomeric ligands added. during metallation, rigidity of the covalent tether in the dimeric ligand, etc. Multimetallic polymeric azo dyes were reported previously by Banerjie et al (Vishwanath Banerjie, Arun K. Dey Makromol. *Chem., Rapid Commun.* 1, 41–46 (1980)) but the ligands described are bidentate (5,5'-(p-phenylenebisazo)diquinolin-8-ol) and the azo group is not a coordination site. The participation of the azo group as a coordination site is critical to the light stability and chemical (or thermal) stability of the dye.

There is still a need for a new class of multimetallic polymeric azo colorants which exhibit light and thermal stability. Such dyes have potential applications either as pigments or dyes in electrophotography, displays, plastics, coatings, recording media, nanotechnology, or inkjet inks.

SUMMARY OF THE INVENTION

This invention provides a multimetallic oligomeric or polymeric colorant wherein said colorant is derived from the polymerization of a polyvalent metal cation with a dimeric tridentate ligand containing a coordinating azo group. In one embodiment the colorant is represented by formulae 1a, 2a, 3a, 1b, 2b, or 3b:

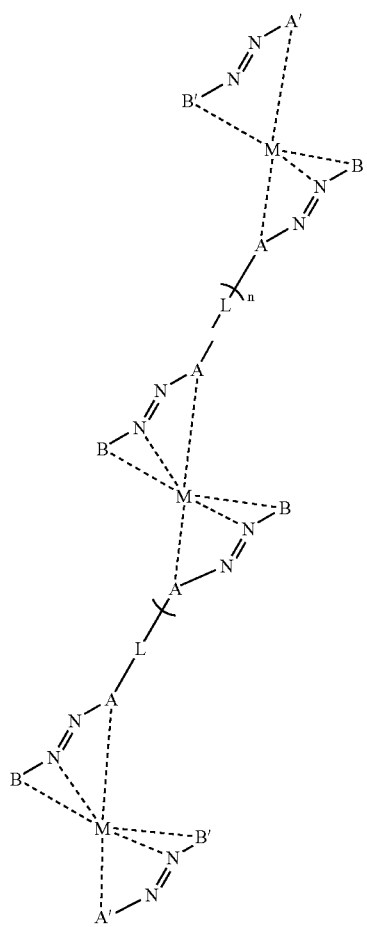

1a

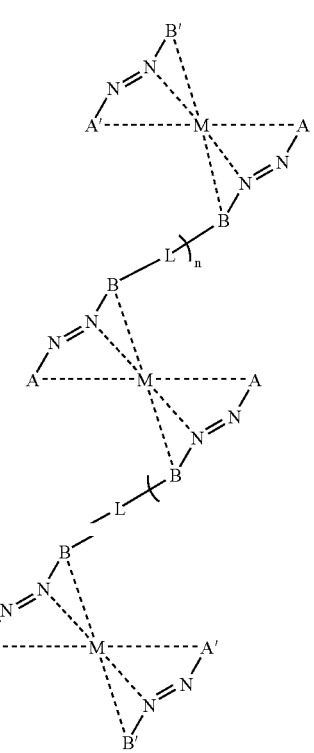

2a

-continued

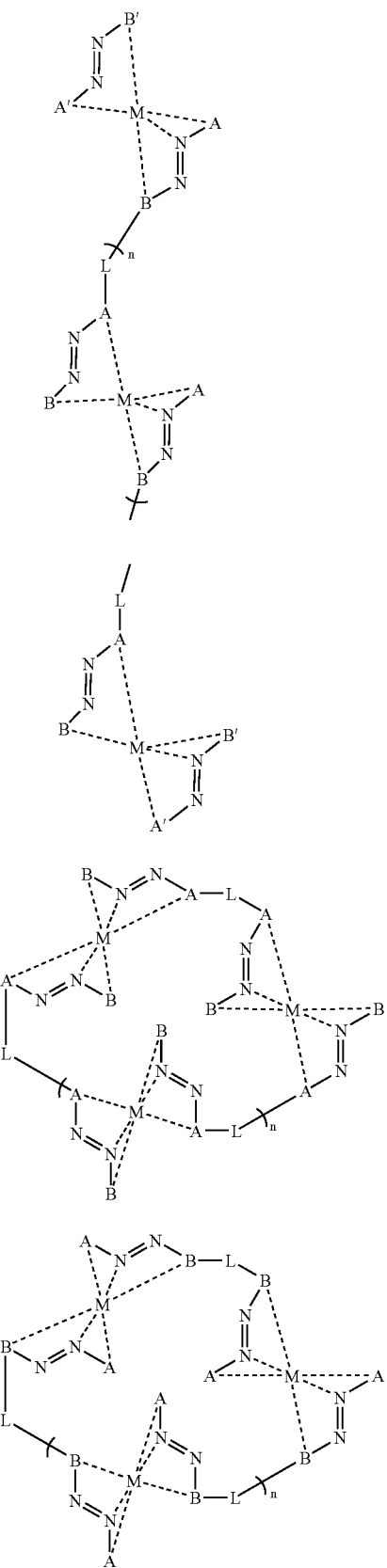

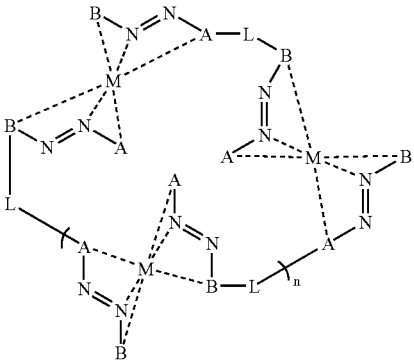

wherein A, A', B and B' independently comprise sites capable of forming a coordinate bond with a polyvalent metal ion, wherein said site is 2, 3 or 4 bonds away from the azo group;

L is an unconjugated linking group chosen such that the colorants with formula A-N=N—B-L-B—N=N-A, B—N=N-A-L-A-N=N—B or A-N=N—B-L-A-N=N—B cannot form an intramolecular monomeric complex with the metal ion M;

M is a polyvalent transition metal ion; and n represents an integer from 0 to 2000.

This invention provides multimetallic polymeric azo colorants which are useful in applications where higher molecular weight has a positive impact on the physical properties of the dye such as the stability to light and atmospheric gases, resistance to solvents, thermal stability, and migration resistance.

DETAILED DESCRIPTION OF THE INVENTION

The dyes of the invention are multimetallic oligomeric or polymeric colorants wherein said colorant is derived from the polymerization reaction of a polyvalent metal cation with a dimeric tridentate ligand containing a coordinating azo group. When an azo dye participates as a ligand in a 2:1 complex with a transition metal cation and if two ligand molecules are covalently bound such that an intramolecular complexation is not possible, they can, upon metallation, form a multimetallic polymeric azo structure.

In a preferred embodiment of the invention, the colorants employed in the invention may be represented by the following general structures:

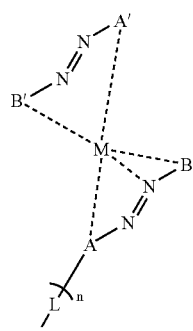

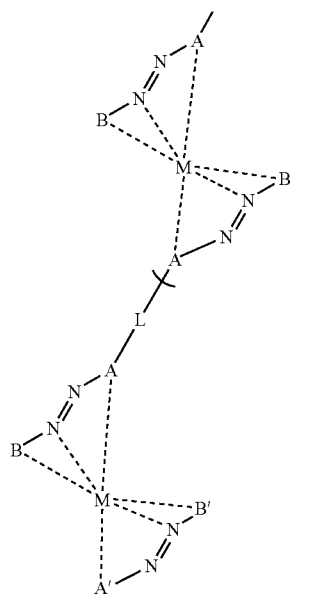
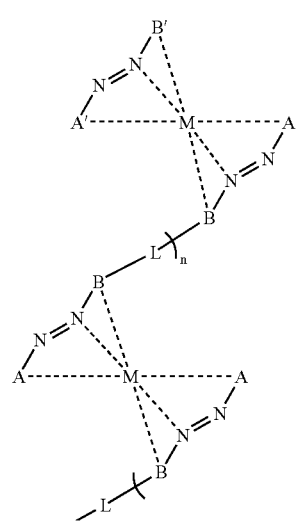
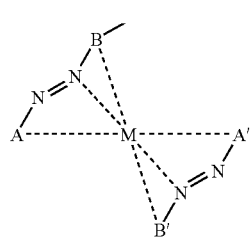
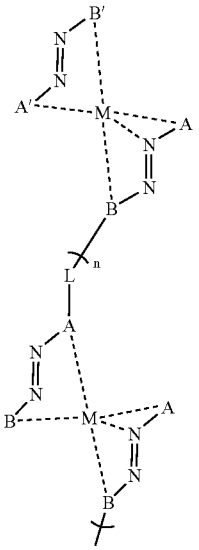
3a
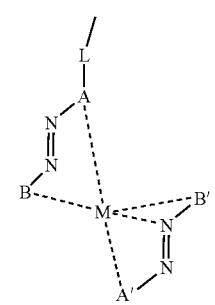
2a
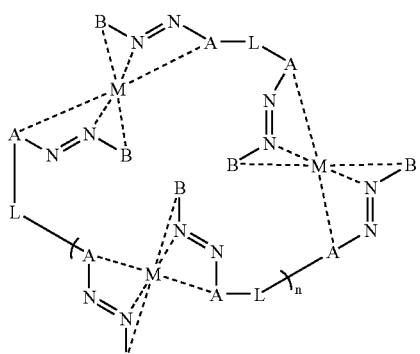
1b
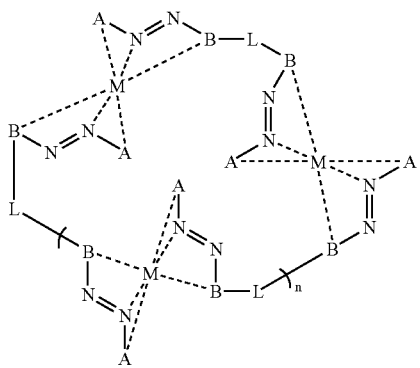
2b

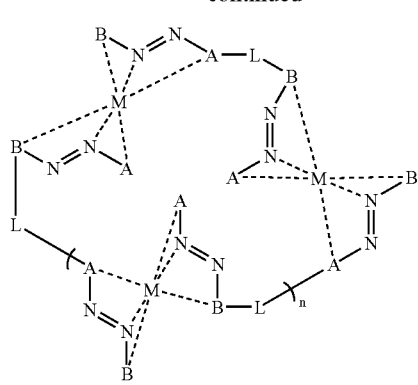

wherein A, A', B and B' independently comprise sites capable of forming a coordinate bond with a polyvalent metal ion, wherein the site is 2, 3 or 4 bond away from the azo group; L is independently an unconjugated linking group chosen such that the colorants with formula A-N=N—B-L-B—N=N-A, B—N=N-A-L-A-N=N—B or A-N=N—B-L-A-N=N—B cannot form an intramolecular monomeric complex with the metal ion; M is a polyvalent transition metal ion; and n represents an integer from 0 to 2000.

A, A', B or B' may be independently represented by structure I or structure II:

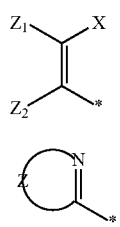

wherein *denotes the bond to the azo group; X is a heteroatom or group of atoms containing a heteroatom capable of forming a coordinate bond with a polyvalent transition metal ion; $Z_1$ is independently H, a substituted or unsubstituted alkyl group, a substituted or unsubstituted aryl group, a substituted or unsubstituted hetaryl group, a substituted or unsubstituted alkoxy group, a substituted or unsubstituted aryloxy group, an amino group, a substituted or unsubstituted alkyl or dialkylamino group or a substituted or unsubstituted aryl or diarylamino group; $Z_2$ is independently the same as $Z_1$, a cyano or a nitro group, a substituted or unsubstituted alkyl or arylsulfonyl group, a substituted or unsubstituted alkoxy or aryloxycarbonyl group, a substituted or unsubstituted alkyl, dialkyl, aryl, diaryl or aralkylcarbamoyl group, a substituted or unsubstituted alkyl, dialkyl, aryl, diaryl or aralkylsulfamoyl group, a substituted or unsubstituted alkanoyl or substituted or unsubstituted aroyl group; $Z_1$ and $Z_2$ together may represent the atoms necessary to form a 5- to 7-membered alicyclic, aromatic or heteroaromatic ring; and/or $Z_1$ and X may be combined together to form a 5- to 7-membered alicyclic or heteroaromatic ring; and Z contains the atoms necessary to form a substituted or unsubstituted, fused or unfused heterocyclic ring;

In another embodiment, structure I is represented by the following formulae which may be substituted, in addition to the X group, with any other functional group that does not interfere with the action of the colorant:

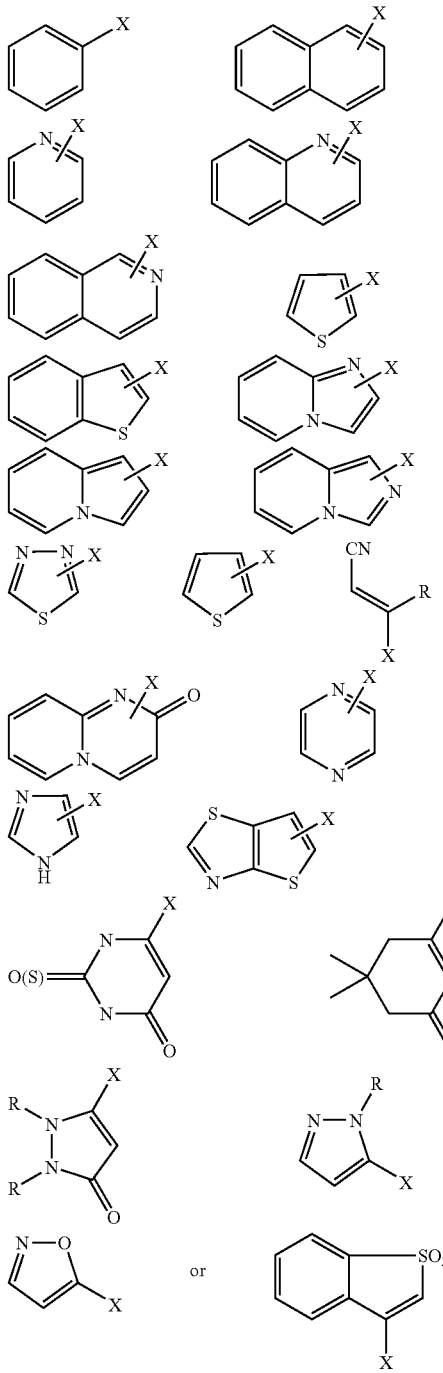

wherein X may be a hydroxy, carboxy, amino, or imino group, an alkyl- or arylsulfonyl group, an alkyl- or arylsulfonamido group, a sulfamoyl group, an N-aryl- or N-alkyl-sulfamoyl group, an alkoxy- or aryloxycarbonyl group, an alkyl- or arylcarbonyl group, a sulfo group, or an aryloxy or alkoxy group. R is a substituted or unsubstituted aryl or alkyl group;

In another embodiment of the invention, structure I is represented by the following formulae:

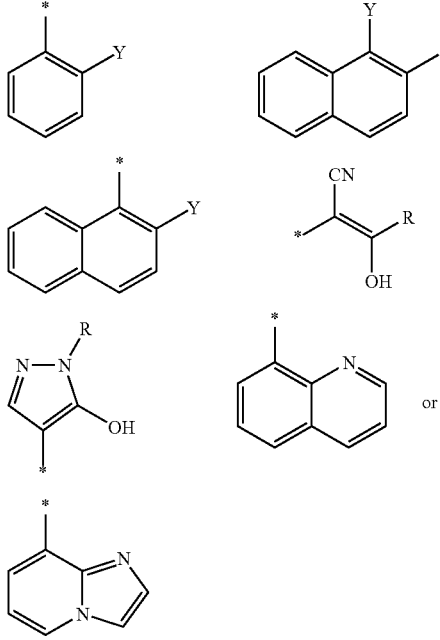

wherein * denotes the bond to the azo group; Y is a hydroxy, carboxy, alkyl- or arylsulfonamide group; and R is a substituted or unsubstituted aryl or alkyl group.

In another embodiment, structure II is represented by the following formulae, which may be substituted with any other functional group that does not interfere with the action of the colorant:

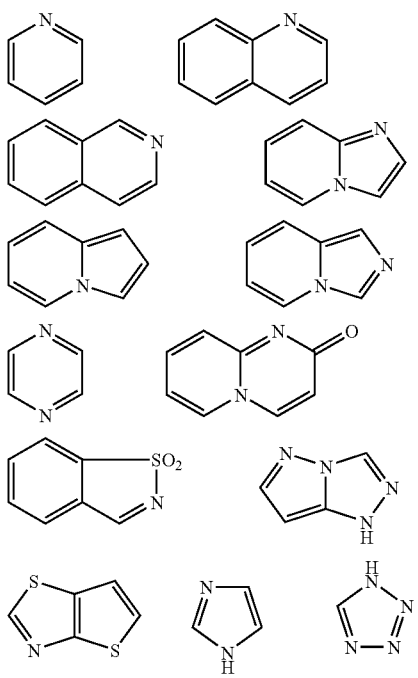

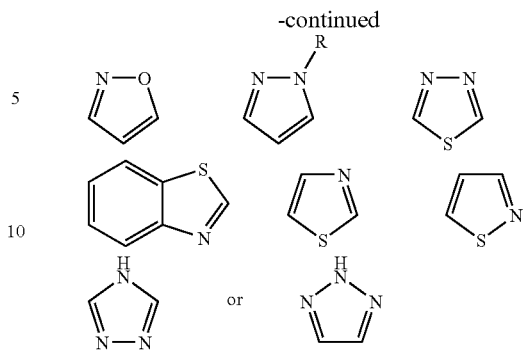

Preferable formulae for structure II are:

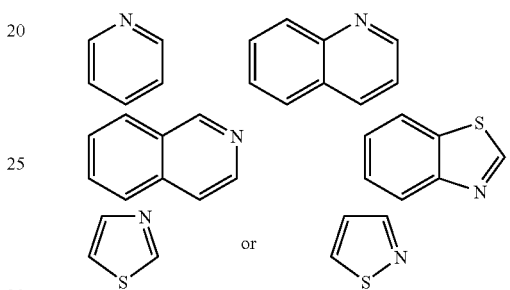

In a preferred embodiment of the invention, the multimetallic polymeric azo colorants have formulae 1a, 2a, 3a, 1b, 2b, or 2c wherein any one of A, A', B or B' is independently represented by any of the aforementioned formulae for structures I and II. Preferably A and A' are of Type I and B and B' are of Type I or Type II, and more preferably B and B' are Type II. n represents and integer from 0 to 2000, preferably from 0 to 1000, and more preferably 0 to 200.

L is independently an unconjugated linking group chosen such that the colorants with formula A-N=N—B-L-B—N=N-A, B—N=N-A-L-A-N=N—B or A-N=N—B-L-A-N=N—B cannot form an intramolecular complex with the metal ion M. Preferred examples of L are alkylene groups which may or may not contain one or more heteroatoms in the chain, —O-L'-O—, —NH-L'-NH—, —CONH-L'-NHCO—, —COO-L'-OCO—, —OCO-L'-COO—, —SO₂NH-L'-NHSO₂—, NHCO-L'-CONH—, —NHSO₂-L'-SO₂NH—, —S-L'-S—, —SO₂-L'-SO₂—, where L' is substituted or unsubstituted alkylene, arylene or heteroarylene linking group. Particularly suitable L groups may include —CH₂—NH-L'-NH—CH₂—, —CONH-L'-NHCO—, —NH-L'-NH—, and, —O-L'-O— groups (wherein L' is substituted or unsubstituted alkylene, arylene or heteroarylene linking group.)

M is a polyvalent transition metal ion. Preferred examples of M are Cr, Ni, Co or Cu, more preferably M is Ni or Cr, and most preferably M is Ni.

Below are examples of colorants of the invention. The colorants in the present invention include but are not limited to these examples. The colorants are shown in the azo tautomeric form, but any example may exist as either the hydrazone tautomeric form or a mixture of hydrazone and azo forms. The colorants are shown with acidic groups in protonated form but any ionized form associated with a positive counterion of any type may be included:

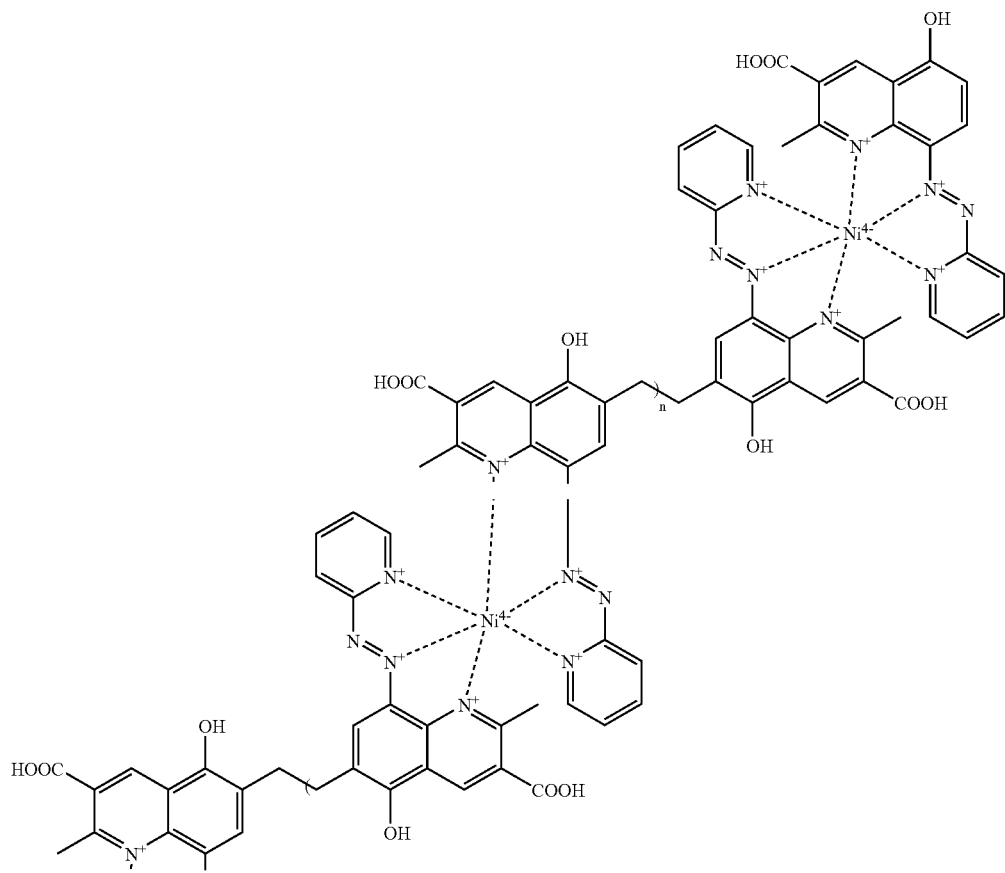
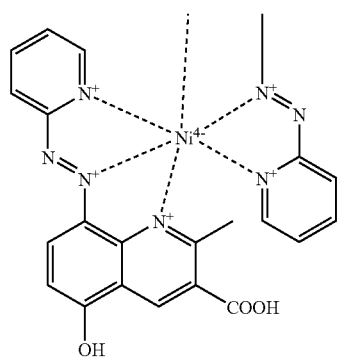
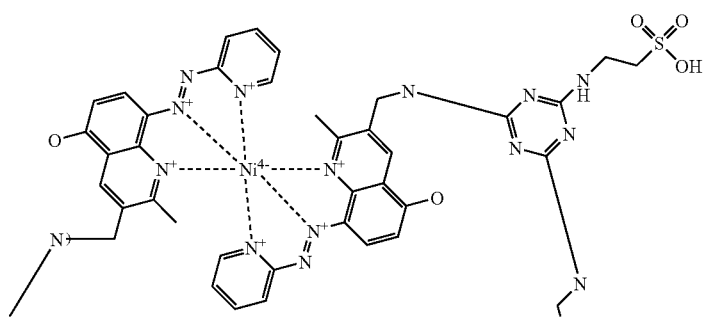

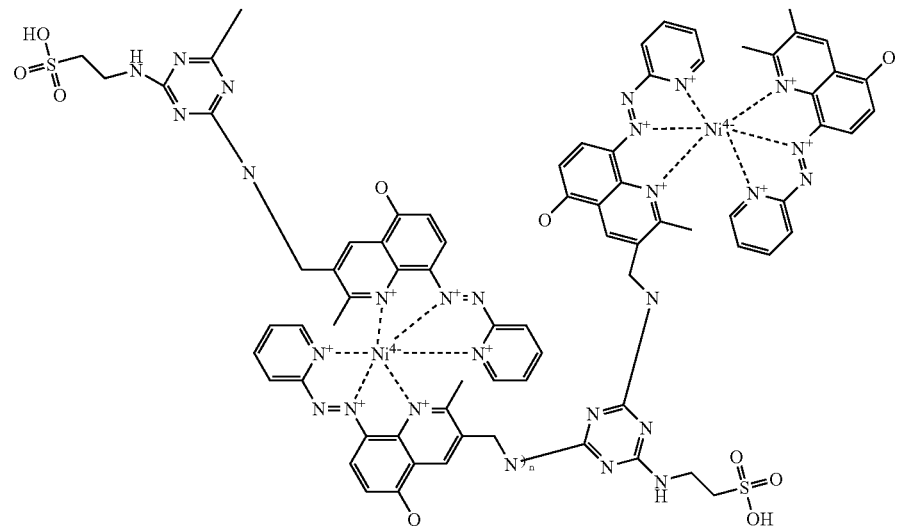
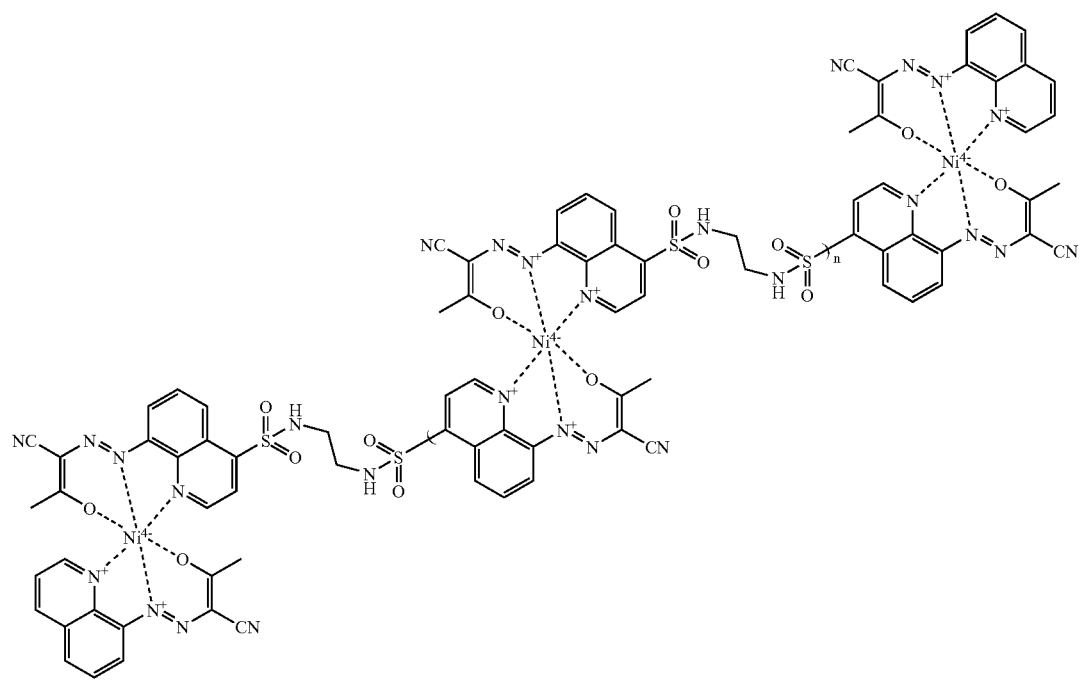
6
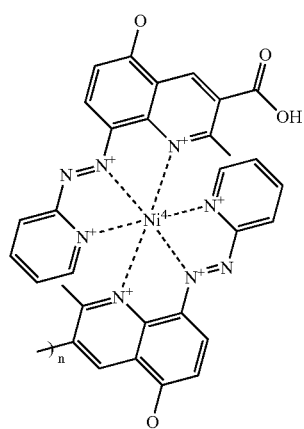
7

-continued
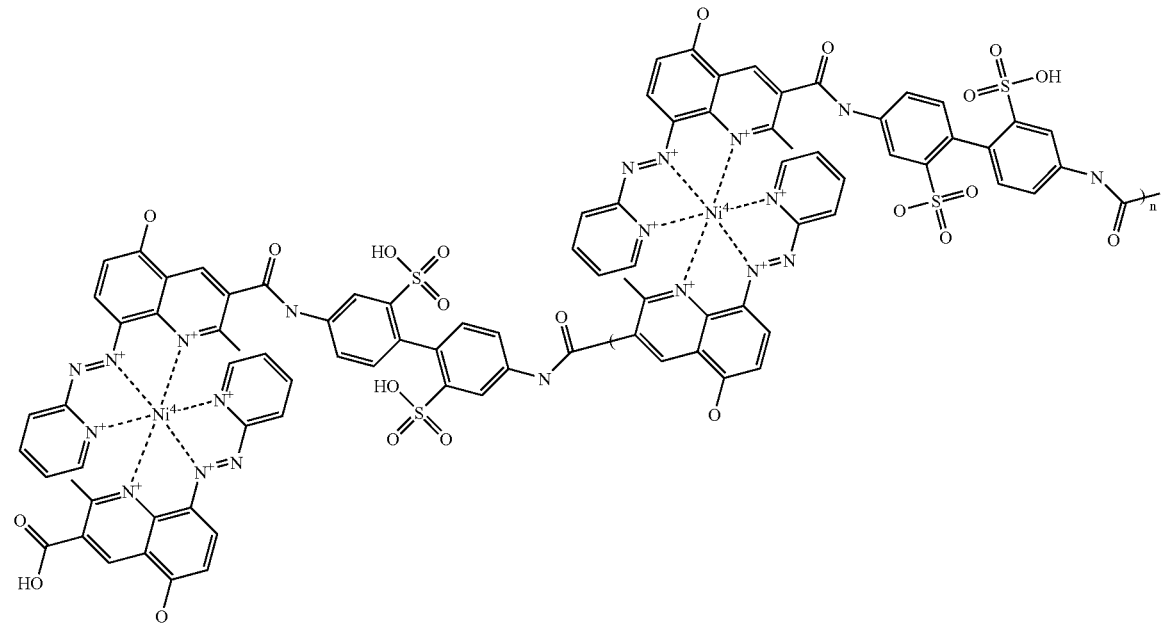
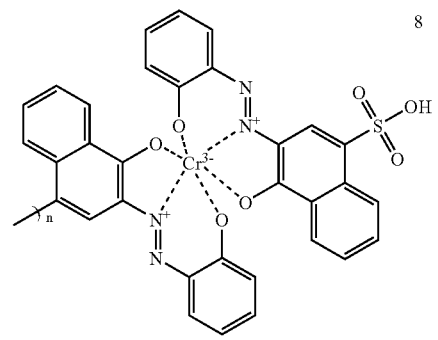
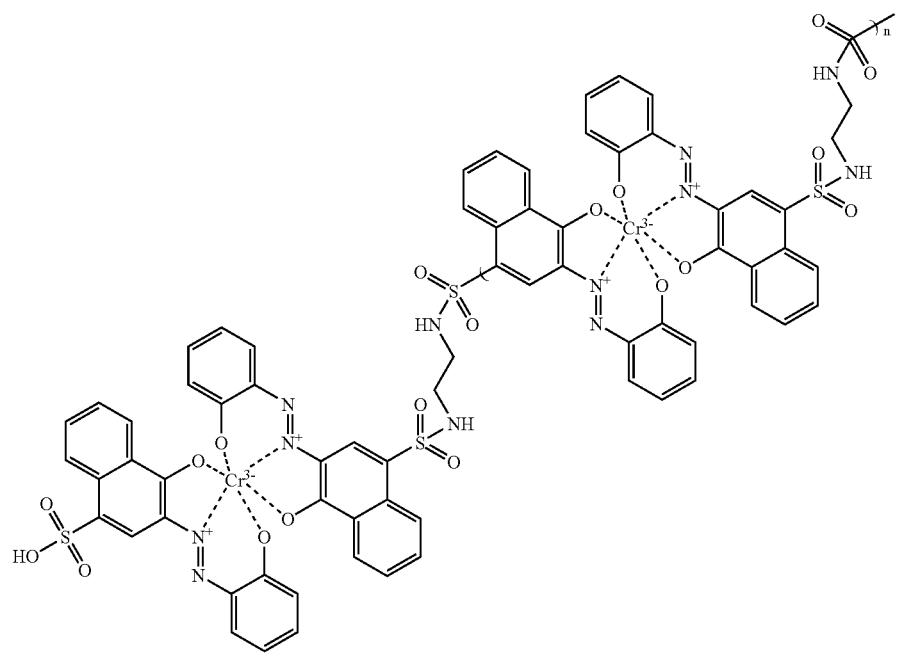

-continued
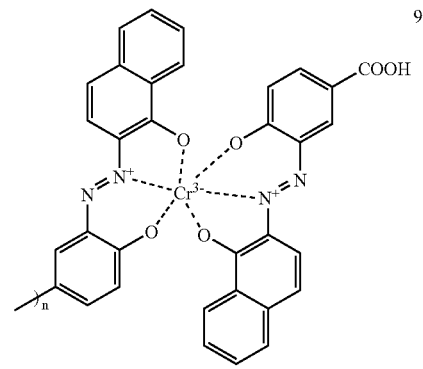
9
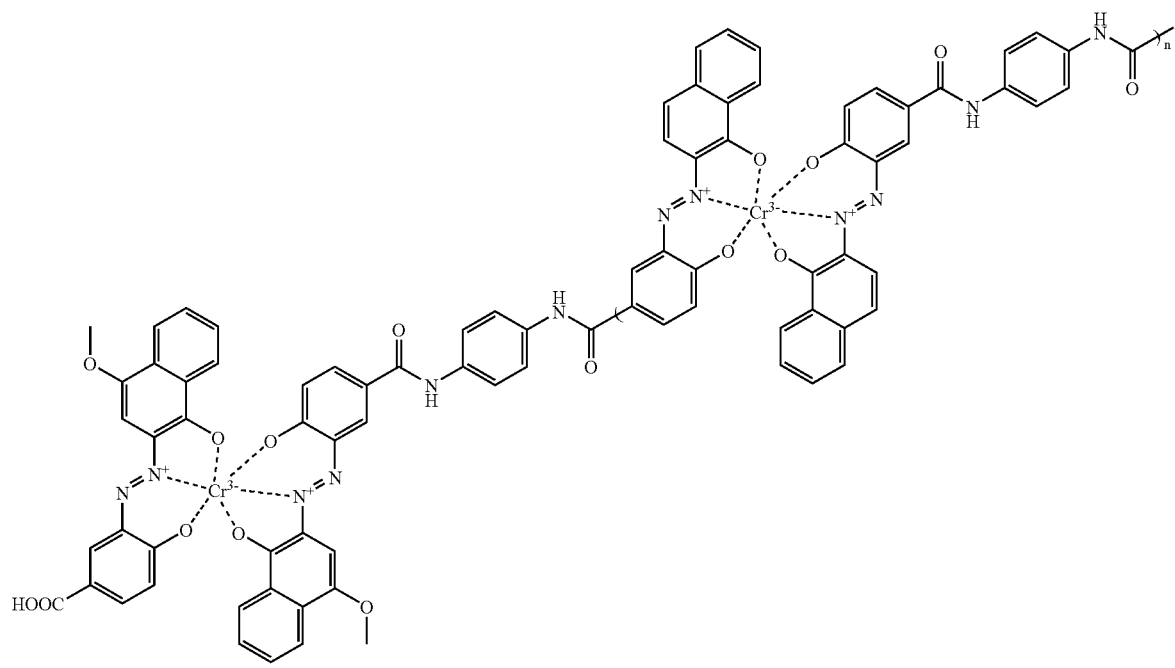
10

-continued
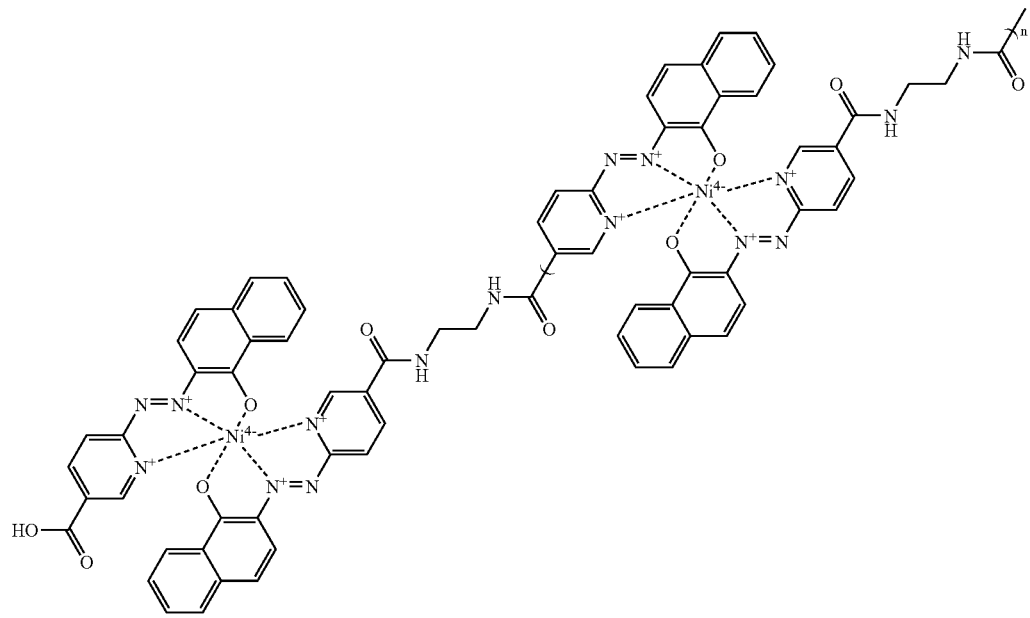
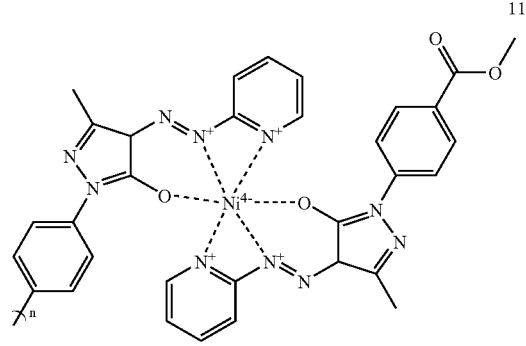
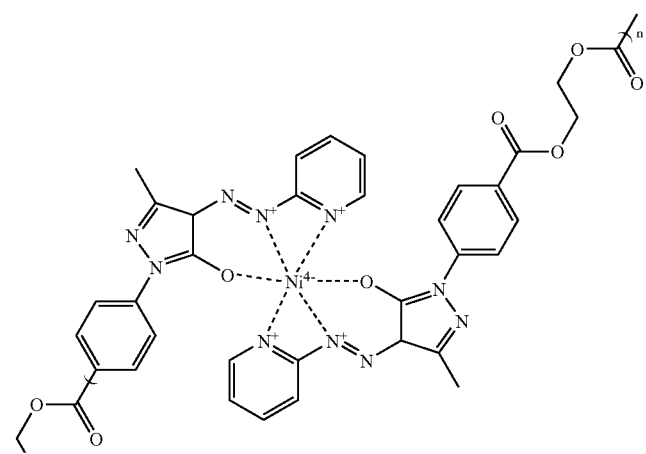

-continued
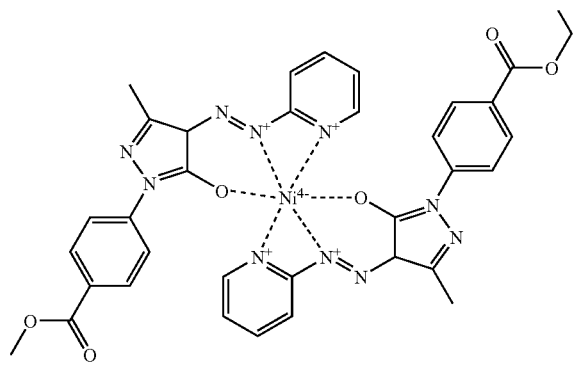
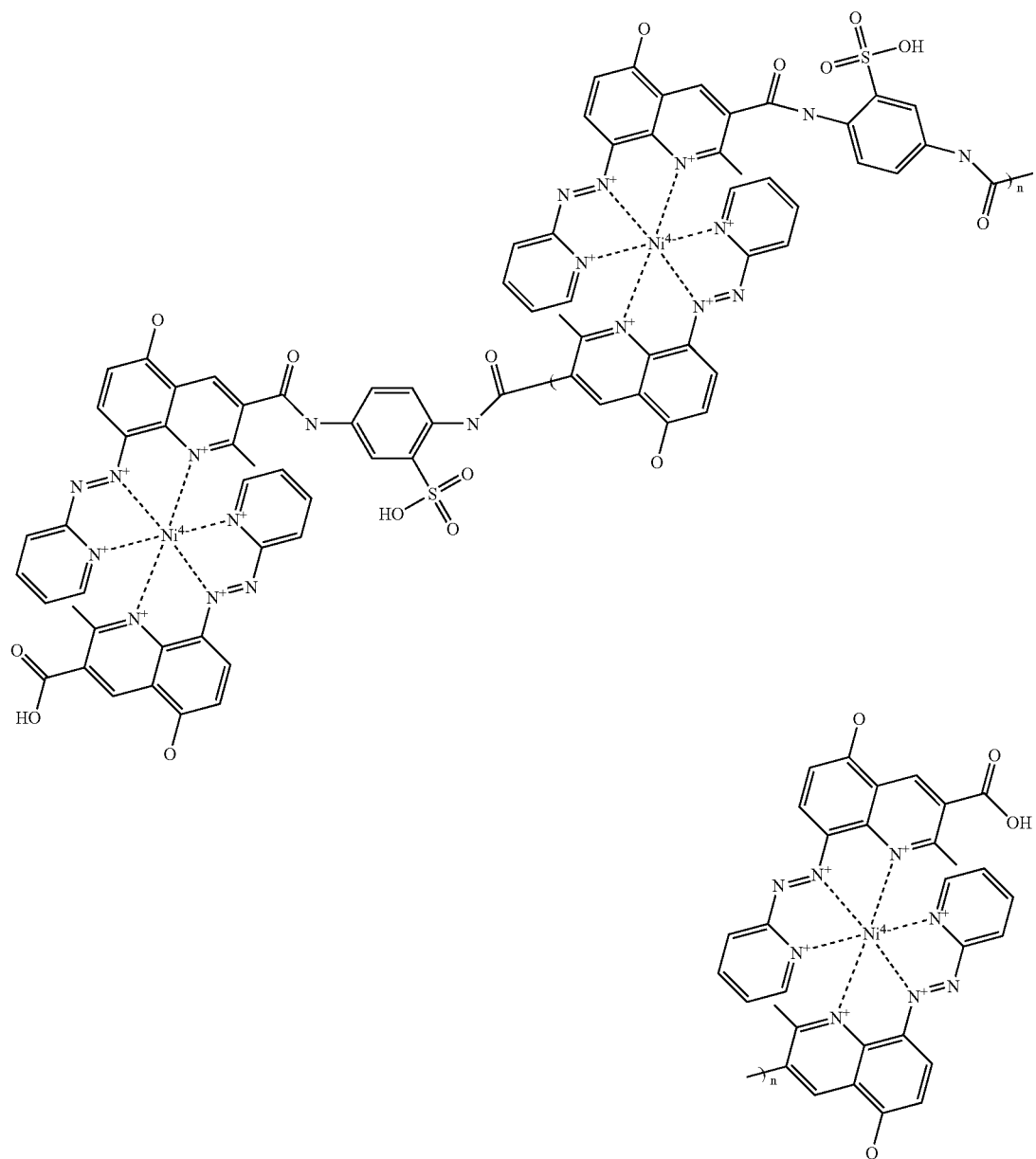
n is 0–200.

Unless otherwise specifically stated, substituent groups, rings or radicals which may be substituted on molecules herein include any groups, whether substituted or unsubstituted, which do not destroy the colorant properties necessary for the chosen utility. When the term "group", "ring" or "radical" is applied to the identification of a substituent containing a substitutable hydrogen, it is intended to encompass not only the substituent's unsubstituted form, but also its form further substituted with any group or groups as herein mentioned. Suitably, the group may be halogen or may be bonded to the remainder of the molecule by an atom of carbon, silicon, oxygen, nitrogen, phosphorous, or sulfur. The substituent may be, for example, halogen, such as chlorine, bromine or fluorine; nitro; hydroxyl; cyano; carboxyl; or groups which may be further substituted, such as alkyl, including straight or branched chain alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy)ethoxy, and 2-dodecyloxyethoxy; aryl such as phenyl, 4-t-butylphenyl, 2,4,6-trimethyiphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentyl-phenoxy)acetamido, alpha-(2,4-di-t-pentylphenoxy)butyramido, alpha-(3-pentadecylphenoxy)-hexanamido, alpha-(4-hydroxy-3-t-butylphenoxy)-tetradecanamido, 2-oxopyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecylphenylcarbonylamino, p-toluylcarboriylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-toluylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-toluylsulfonamido, p-dodecylbenzenesulfonamido, N-methyltetradecylsulfonamido, N,N-dipropylsulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl, N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-toluylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-toluylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3- to 7-membered heterocyclic ring composed of carbon atoms and at least one hetero atom selected from the group consisting of oxygen, nitrogen and sulfur, such as 2-furyl, 2-thienyl, 2-benzimidazolyloxy or 2-benzothiazolyl; quaternary ammonium, such as triethylammonium; and silyloxy, such as trimethylsilyloxy.

If desired, the substituents may themselves be further substituted one or more times with the described substituent groups. The particular substituents used may be selected by those skilled in the art to attain the desired colorant properties for a specific application and can include, for example, hydrophobic groups, solubilizing groups, blocking groups, releasing or releasable groups, etc.

In the above dye descriptions, examples of an alkyl group include methyl, ethyl, isopropyl, hydroxyethyl, 3-sulfopropyl and m-carboxybenzyl. Examples of an aryl group include phenyl, naphthyl, 3,5-biscarboxyphenyl and 4-sulfophenyl. Examples of a heteroaryl group include pyridyl, imidazolyl and quinolyl. Examples of halogen include chloro, fluoro, bromo and iodo. Examples of an acyl group include acetyl and 4-sulfobenzoyl. Examples of an alkoxy group include methoxy, 3-carboxypropoxy and 2-hydroxyethoxy. Examples of an aryloxy group include phenoxy, 3-carboxyphenoxy and 4-sulfophenoxy. Examples of an alkoxy- or aryloxy-carbonyl group of 1–10 carbon atoms include methoxycarbonyl, ethoxycarbonyl, 2-methoxyethoxycarbonyl and 3-sulfophenoxycarbonyl. Examples of an alkyl- aralkyl-, aryl-, diaryl-or dialkyl carbamoyl group include N-methylcarbamoyl, N-methyl-N-4-sulfophenylcarbamoyl, N,N-bis (4-carboxyphenyl)carbamoyl. Examples of an alkyl- aralkyl-, aryl-, diaryl-or dialkyl sulfamoyl group include N-methylsulfamoyl, N-methyl-N-phenyl-sulfamoyl, N-(p-sulfophenyl)sulfamoyl and N,N-bis (4-carboxyphenyl)sulfamoyl. Examples of an acylamino group include acetamido, methoxyethylacetamido and 3-carboxybenzamido. Examples of a ureido group include N-methylureido, ureido and N,N'-dimethylureido. Examples of a sulfonylamino group include methanesulfonamido, p-toluenesulfonamido and 2-sulfatoethanesulfonamido. Examples of an alkylaralkyl-, aryl- diaryl- or dialkylamino group include methylamino, N,N-dimethylamino, methoxyethylamino and 3-sulfoanilino.

The following examples are intended to illustrate but not to limit the invention.

EXAMPLES

In general the polymeric multimetallic colorants of the invention are synthesized as follows. Ligands A-N=N—B-L-B—N=N-A, B—N=N-A-L-A-N=N—B or A-N=N—B-L-A-N=N—B are synthesized using appropriate chemical transformations depending on their specific structure. Stoichiometric amounts of ligand A-N=N—B-L-B—N=N-A or B—N=N-A-L-A-N=N—B or A-N=N—B-L-A-N=N—B, an aqueous solution of a Ni, Cr, Co or Cu salt and optionally monomeric ligand A'-N=N—B' are mixed in dimethylformamide and heated at 85° C. for 4 hours. The polymeric colorant is isolated through precipitation by addition of a suitable non-solvent.

Inventive Example 1

Synthesis of the Dimeric Unmetallized Colorant 13

2-Methyl-5-hydroxy-8-(2-pyridylazo)-quinoline-3-carboxylic acid (3.08 g, 0.01 mole), 2, 5-diaminobenzenesulfonic acid (0.94 g, 0.5 equiv), triethylamine (4.02 mL, 2.5 equiv) and dimethylaminopyridine (0.24 mg, 0.2 equiv) were suspended in 15 mL dimethylformamide (DMF) and stirred at ambient temperature. To this suspension were added 4.75 g O-benzotriazol-1-yl-N,N,N',N'-tetramethyluronium hexafluorophosphate (1.25 equiv) and the resulting mixture was stirred for 24 hours. The crude reaction mixture was filtered and the precipitate was recrystallized from dichloromethane to afford 1.4 g dimer 13 (36 % yield).

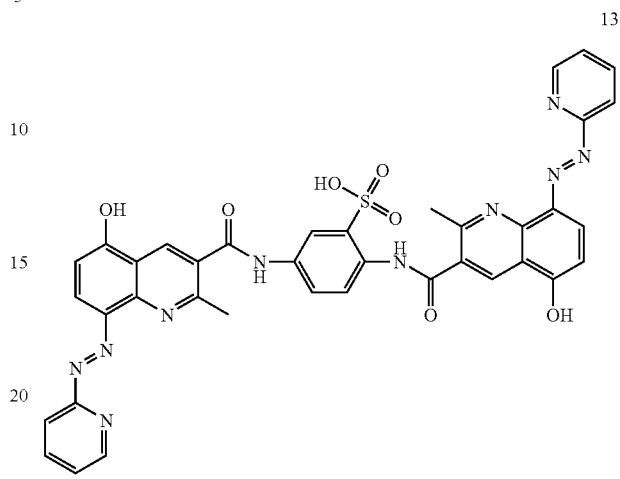

13

Inventive Example 2

Synthesis of the Dimeric Unmetallized Colorant 15

2-methyl-5-hydroxy-8-(2-pyridylazo)-quinoline-3-carboxylic acid (2.47 g, 0.01 mole), 4,4'-diamino-2,2'-biphenyldisulfonic acid (1.72g, 0.5 equiv) and NaHCO₃ (2.52 g, 0.03 moles) were dissolved in 100 mL water. 4-(4,6-dimethoxy-1,3,5-triazin-2-yl)-4-methylmorpholinium chloride (DMTMM, 7.5 g, 0.027 moles) was added and the reaction mixture was heated at 50 C overnight. The product was purified by preparative HPLC to yield 2 g pure dimer 14 (50% yield).

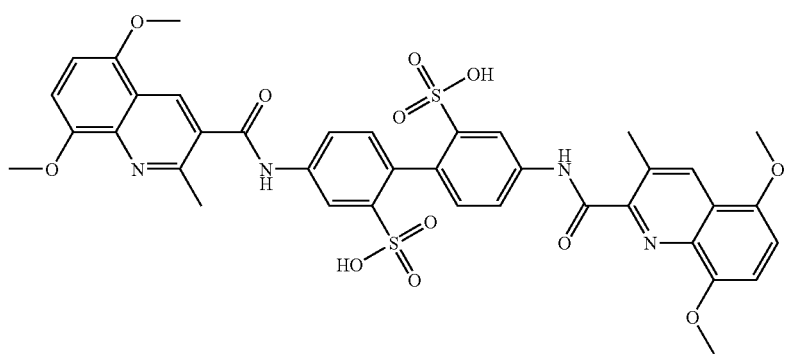

14

Dimer 14 (0.8 g) was suspended in 50 mL water and cooled in ice bath. To this suspension was added drop wise a solution of 2.74 g cerium ammonium nitrate (CAN) in 10 mL water. The reaction mixture was stirred 45 min in ice bath and a solution of 0.455 g pyridyl hydrazine dihydrochloride in 5 mL water was added drop wise. The ice bath was removed and the reaction mixture stirred for 16 hours at ambient temperature. 100 mL acetone was added in order to precipitate the product and the resulting red precipitate was filtered and washed with 2×10 mL acetone. Yield 0.8 g 15 (86% of theoretical).

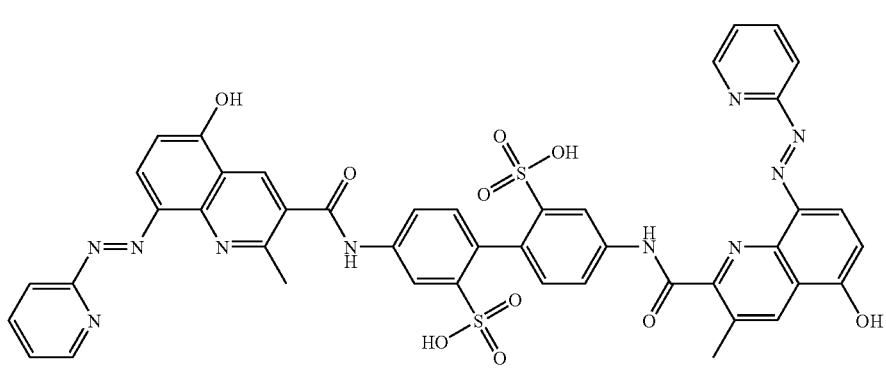

Inventive Example 3

Synthesis of the Dimeric Unmetallized Colorant 18

3-Aminomethyl-2methyl-5,8-dimethoxyquinoline (1.16 g) and 0.84 g NaHCO$_3$ were dissolved in 25 mL water+25 mL acetonitrile and the resulting solution was cooled in ice bath. Added 0.46 g cyanuric chloride dissolved in 25 mL acetone was added, the solution was removed from the ice bath and stirred at 25° C. for 2.5 hours. Approx 100 mL water were added and a fluffy off white precipitate formed. Filtered, washed and dried to obtain 1.4 g of 16 (97% yield).

0.58 g quinoline dimer 16 was suspended in 20 mL ethanol and cooled in ice bath. A solution of 1.64 g ammonium cerium nitrate in 10 mL of water was added dropwise and stirred 1.5 hours. Then a solution of 0.8 g pyridyl hydrazine dihydrochloride in 5 ml of water was added and the ice bath removed. After stirring for another 1.5 hours, the ethanol was evaporated with a rotary evaporator and 30 mL of water were added. The orange product 17 precipitated and was isolated by filtration (0.6 g, 86% yield).

To a solution of 0.35 g chlorotriazine dimer 16 in 30 ml N-methylpyrrolidone (NMP) was added a solution of 0.07 g of taurine and 0.27 g sodium carbonate in 15 mL of water and the resulting mixture was heated at 100° C. for 4 h. The product was precipitated by addition of 200 mL water and subsequent adjustment of the pH to 5. The precipitate was filtered, washed with 2×5 mL ice water and dried in the vacuum oven to afford 0.315 g dimer 18 (80% yield).

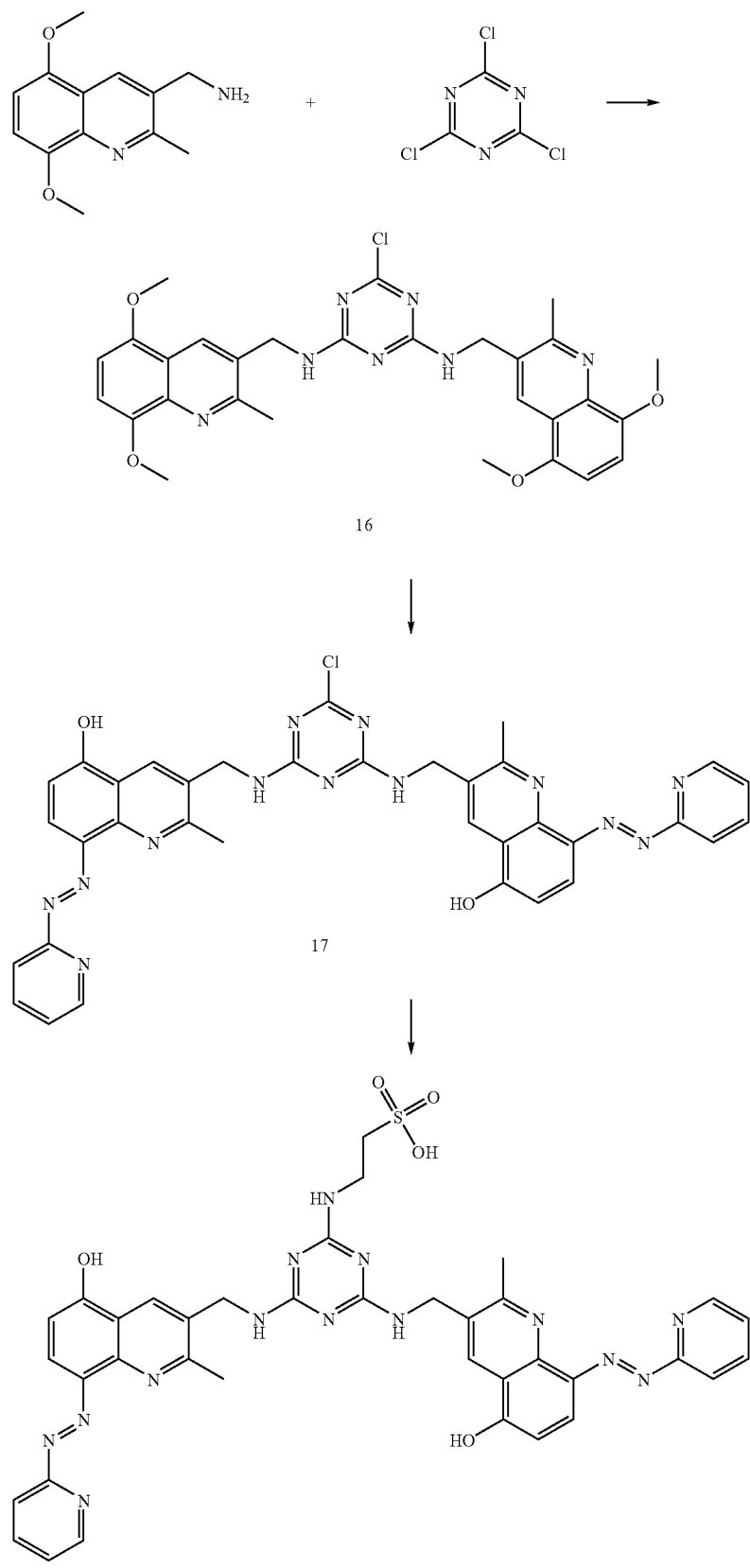

Inventive Example 4

Polymer Synthesis/Metallation of Ligand 13 Using Capping Monomer 19

0.84 g dimer 13 and 67 mg monomer 19 were suspended/dissolved in 50 mL DMF. The mole ratio of dimer/monomer is 5:1. To this mixture were added 297 mg $Ni(OAc)_2 \cdot 4H_2O$. The mixture was heated at 85° C. for 4 hours. HPLC shows multiple peaks of polymeric species with generic structure 12. The bulk of the solvent was evaporated, 100 mL water was added and the precipitate that formed was collected. by filtration (yield 0.95 g).

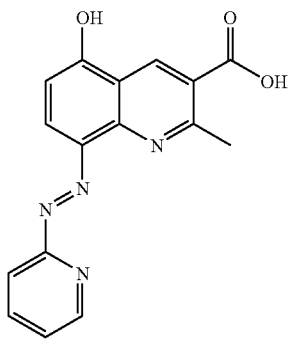

19

Inventive Example 5

Polymer Synthesis/Metallation of Ligand 13

A solution of 77 mg of dimer 13 and 25 mg $Ni(OAc)_2 \cdot 4H_2O$ in 5 mL DMF and 3 mL water was heated at 85° C. for 18 hours. The solvent was evaporated with a high-vacuum centrifuge and the polymeric multimetallic colorant obtained was analyzed by size-exclusion chromatography (SEC). SEC results:

Absolute Molecular Weight Averages:

$M_n$(the number average)=26700, $M_w$(the weight average)=30300, $M_z$(the z-average)=35700

Poly(methyl methacrylate) Equivalent Molecular Weight Averages:

$M_n$=6140, $M_w$=6710, $M_z$=7340

Inventive Example 6

Polymer Synthesis/Metallation of Ligand 17

A suspension of 70 mg dimer 17 and 25 mg $Ni(OAc)_2 \cdot 4H_2O$ in 5 ml DMF and 2 mL water were heated at 85° C. for 16 h. The resulting polymer was analized by Matrix Assisted Laser Desorption Ionization (MALDI). MALDI results indicate the presence of species with general formula $L_mNi_m$ where L is ligand 17 and m is an integer between 2–17. This data confirms the presence of cyclic oligomeric/polymeric species with general structure 2b.

The invention has been described in detail with particular reference to useful embodiments thereof, but it will be understood that variations and modifications can be effected within the spirit and scope of the invention.

The invention claimed is:

1. A multimetallic oligomeric or polymeric colorant wherein said colorant is derived from the polymerization of a metal cation with a dimeric tridentate ligand containing a coordinating azo group.

2. The multimetallic polymeric colorant of claim 1 wherein the colorant is represented by formulae 1a, 2a, 3a, 1b, 2b, or 3b:

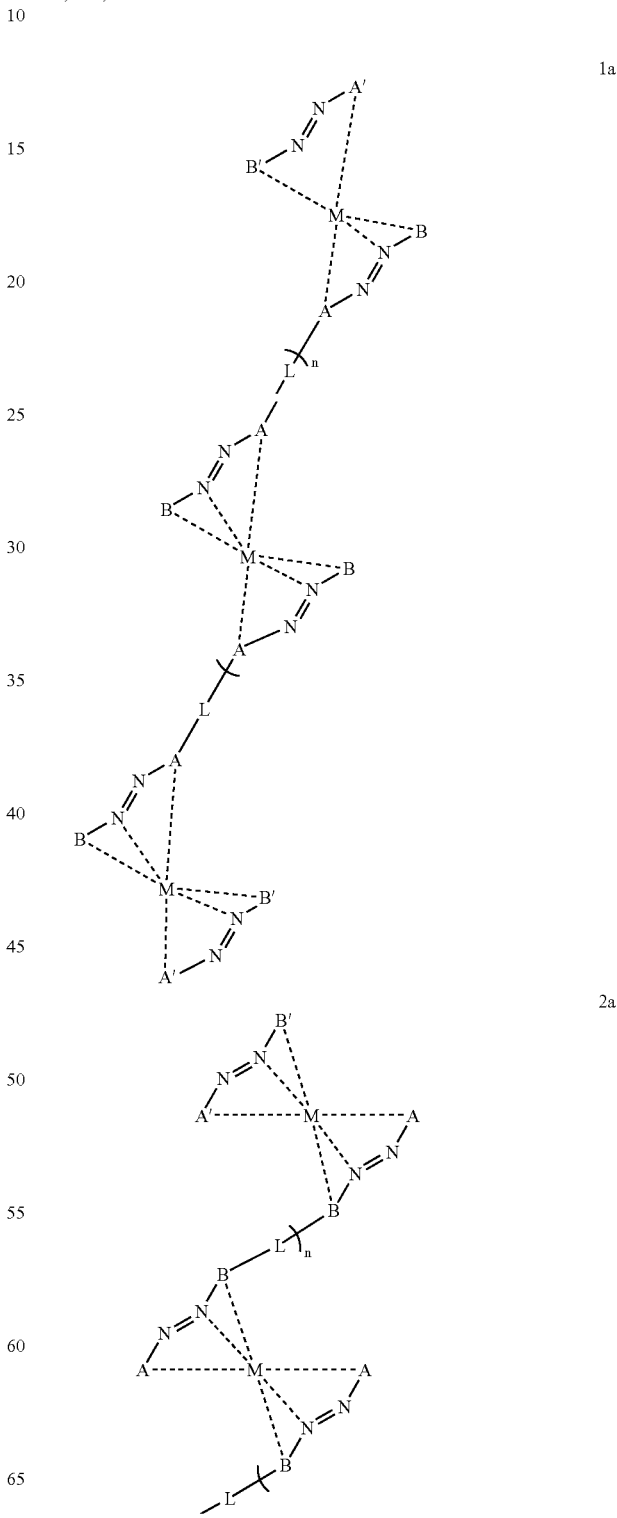

-continued

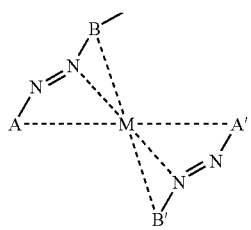

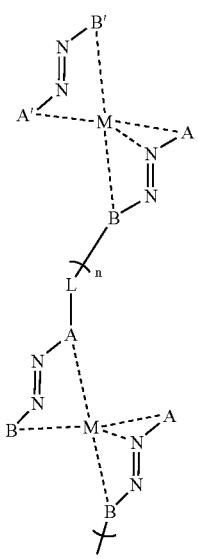

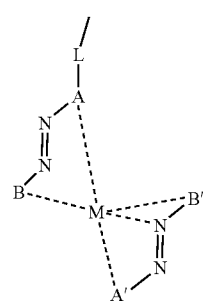

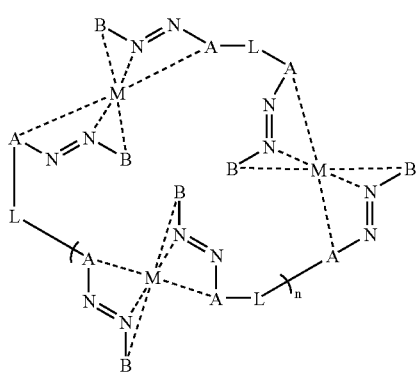

-continued

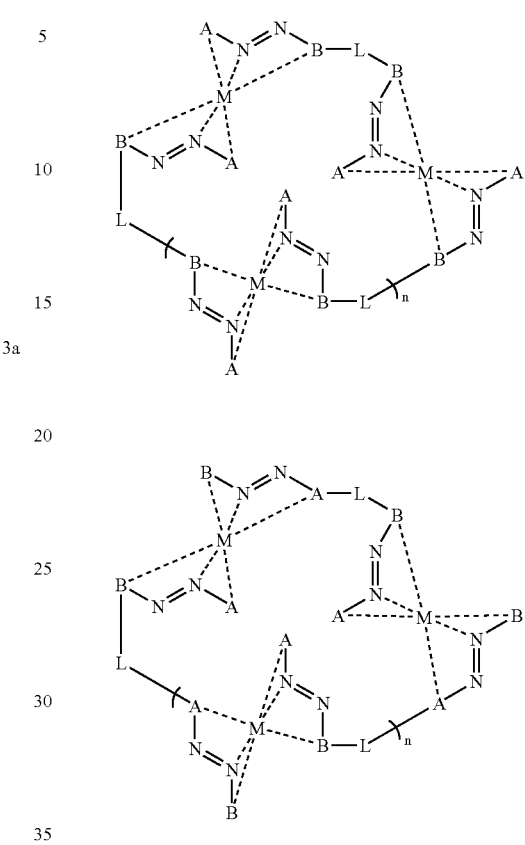

wherein A, A', B and B' independently comprise sites capable of forming a coordinate bond with a polyvalent metal ion, wherein said site is 2, 3 or 4 bonds away from the azo group;

L is independently an unconjugated linking group chosen such that the colorants with formula A-N=N—B-L-B—N=N-A, B—N=N-A-L-A-N=N—B or A-N=N—B-L-A-N=N—B cannot form an intramolecular complex with the metal ion M;

M is a polyvalent transition metal ion; and n represents an integer from 0 to 2000.

3. The multimetallic polymeric colorant of claim 1 wherein A, A', B and B' are independently represented by structure I or II:

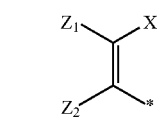   I

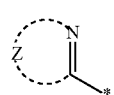   II

* denotes the bond to the azo group wherein

X is a heteroatom or group of atoms containing a heteroatom capable of forming a coordinate bond with a polyvalent transition metal ion;

$Z_1$ is independently H, a substituted or unsubstituted alkyl group, a substituted or unsubstituted aryl group, a substituted or unsubstituted hetaryl group, a substituted or unsubstituted alkoxy group, a substituted or unsubstituted aryloxy group, an amino group, a substituted or unsubstituted alkyl or dialkylamino group or a substituted or unsubstituted aryl or diarylamino group;

$Z_2$ is independently the same as $Z_1$, a cyano or a nitro group, a substituted or unsubstituted alkyl or arylsulfonyl group, a substituted or unsubstituted alkoxy or aryloxycarbonyl group, a substituted or unsubstituted alkyl, dialkyl, aryl, diaryl or aralkylcarbamoyl group, a substituted or unsubstituted alkyl, dialkyl, aryl, diaryl or aralkylsulfamoyl group, a substituted or unsubstituted alkanoyl or substituted or unsubstituted aroyl group, wherein $Z_1$ and $Z_2$ together may represent the atoms necessary to form a 5- to 7-membered alicyclic, aromatic or heteroaromatic ring and/or $Z_1$ and X may be combined together to form a 5- to 7-membered alicyclic or heteroaromatic ring; and Z contains the atoms necessary to form a substituted or unsubstituted, fused or unfused heterocyclic ring.

4. The multimetallic polymeric colorant of claim 3 wherein structure I is:

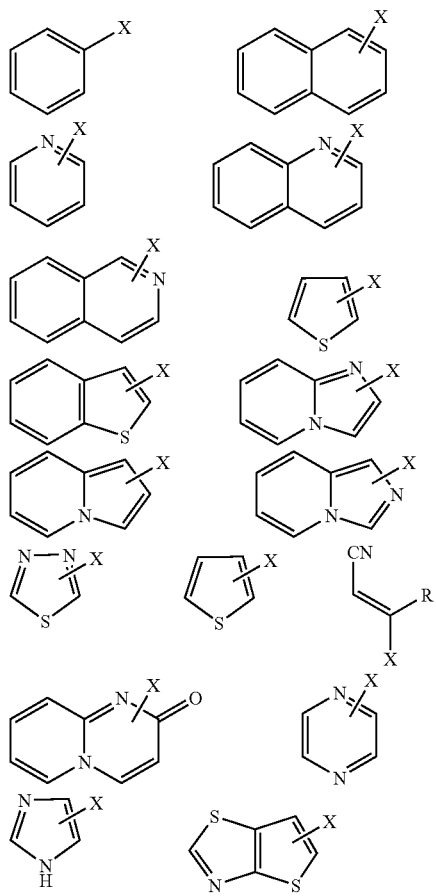

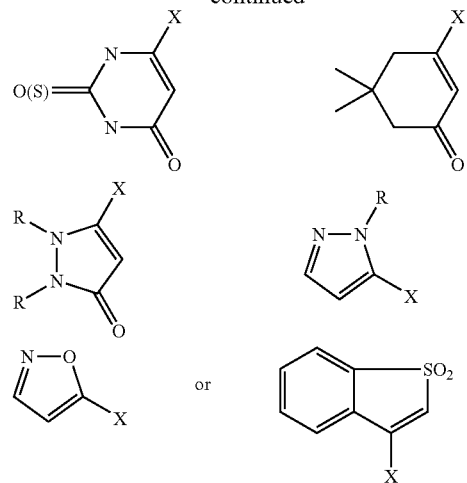

wherein X is a hydroxy, carboxy, amino, or imino group, alkyl- or arylsulfonyl, alkyl- or arylsulfonarido group, a sulfamoyl group, an N-aryl- or N-alkylsulfamoyl group, an alkoxy- or aryloxycarbonyl group, an alkyl- or arylcarbonyl group, a sulfo goup, or an aryloxy or alkoxy group; and R is a substituted or unsubstituted aryl or alkyl group.

5. The multimetallic polymeric colorant of claim 3 wherein structure II is:

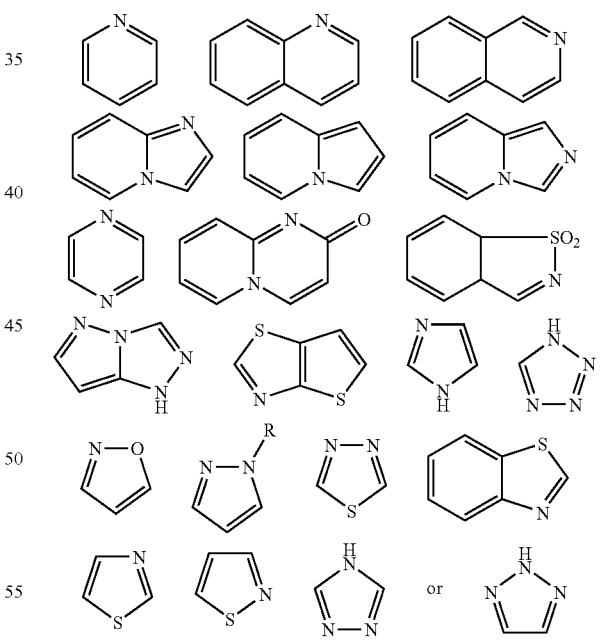

6. The multimetallic polymeric colorant of claim 4 wherein structure II is:

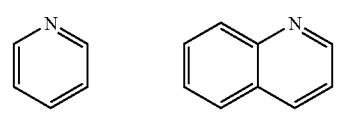

-continued

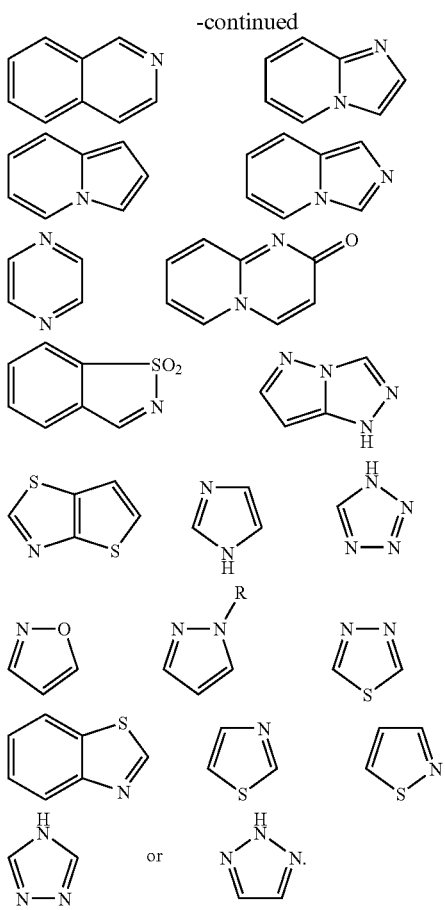

7. The multimetallic polymeric colorant of claim 3 wherein structure I is:

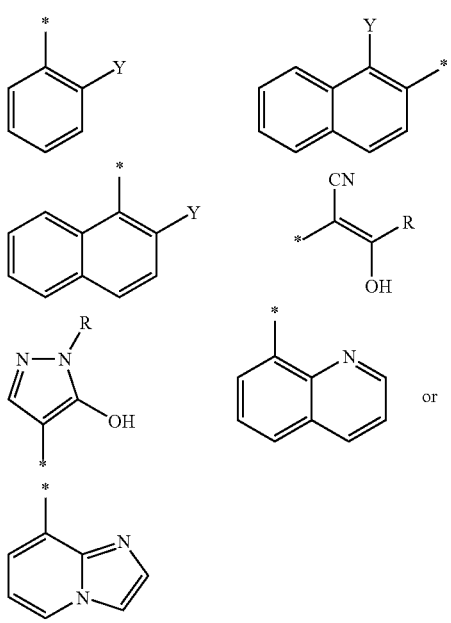

* denotes the bond to the azo group wherein Y is a hydroxy, carboxy, alkyl- or arylsulfonamide group and R is a substituted or unsubstituted aryl or alkyl group.

8. The multimetallic polymeric colorant of claim 3 wherein structure II is:

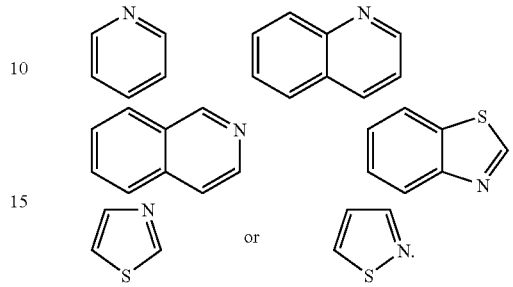

9. The multimetallic polymeric colorant of claim 7 wherein structure II is:

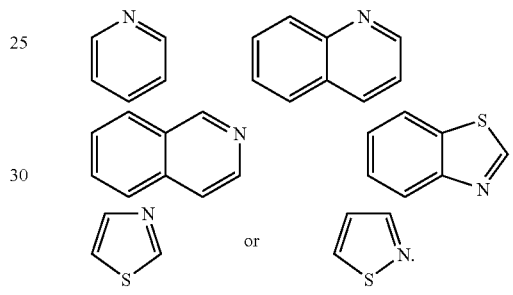

10. The multimetallic polymeric colorant of claim 3 wherein A and A' are represented by Structure I and B and B' are represented by Structure I or II.

11. The multimetallic polymeric colorant of claim 3 wherein A and A' are represented by Structure I and B and B' are represented by Structure II.

12. The multimetallic polymeric colorant of claim 6 wherein A and A' are represented by Structure I and B and B' are represented by Structure II.

13. The multimetallic polymeric colorant of claim 2 wherein L is independently an alkylene group which may or may not contain one or more heteroatoms in the chain or a —O-L'-O—, —NH-L'-NH—, —CONH-L'-NHCO—, —COO-L'-OCO—, —OCO-L'-COO—, —SO$_2$NH-L'-NHSO$_2$—, NHCO-L'-CONH—, —NHSO$_2$-L'-SO$_2$NH—, —S-L'-S—, or —SO$_2$-L'-SO$_2$— group wherein L' is a substituted or unsubstituted alkylene, arylene or heteroarylene linking group.

14. The multimetallic polymeric colorant of claim 3 wherein L is independently an alkylene group which may or may not contain one or more heteroatoms in the chain or a —O-L'-O—, —NH-L'-NH—, —CONH-L'-NHCO—, —COO-L'-OCO—, —OCO-L'-COO—, —SO$_2$NH-L'-NHSO$_2$—, NHCO-L'-CONH—, —NHSO$_2$-L'-SO$_2$NH—, —S-L'-S—, or —SO$_2$-L'-SO$_2$— group wherein L' is a substituted or unsubstituted alkylene, arylene or heteroarylene linking group.

15. The multimetallic polymeric colorant of claim 6 wherein L is independently an alkylene group which may or may not contain one or more heteroatoms in the chain or a —O-L'-O—, —NH-L'-NH—, —CONH-L'-NHCO—, —COO-L'-OCO—, —OCO-L'-COO—, —SO$_2$NH-L'-NHSO$_2$—, NHCO-L'-CONH—, —NHSO$_2$-L'-SO$_2$NH—, —S-L'-S—, or —SO$_2$-L'-SO$_2$— group wherein L' is a substituted or unsubstituted alkylene, arylene or heteroarylene linking group.

16. The multimetallic polymeric colorant of claim 2 wherein L is independently a —CH$_2$—NH-L'-NH—CH$_2$—, —O-L'-O—, —NH-L'-NH—, or —CONH-L'-NHCO— group wherein L' is a substituted or unsubstituted alkylene, arylene or heteroarylene linking group.

17. The multimetallic polymeric colorant of claim 3 wherein L is independently a —CH$_2$—NH-L'-NH—CH$_2$—, —O-L'-O—, —NH-L'-NH—, or —CONH-L'-NHCO— group wherein L' is a substituted or unsubstituted alkylene, arylene or heteroarylene linking group.

18. The multimetallic polymeric colorant of claim 6 wherein L is independently a —CH$_2$—NH-L'-NH—CH$_2$—, —O-L'-O—, —NH-L'-NH—, or —CONH-L'-NHCO— group wherein L' is a substituted or unsubstituted alkylene, arylene or heteroarylene linking group.

19. The multimetallic polymeric colorant of claim 2 wherein M is independently Cr, Ni, Co or Cu.

20. The multimetallic polymeric colorant of claim 3 wherein M is independently Cr, Ni, Co or Cu.

21. The multimetallic polymeric colorant of claim 6 wherein M is independently Cr, Ni, Co or Cu.

22. The multimetallic polymeric colorant of claim 2 wherein n is independently 0–1000.

23. The multimetallic polymeric colorant of claim 3 wherein n is independently 0–1000.

24. The multimetallic polymeric colorant of claim 6 wherein n is independently 0–1000.

* * * * *